United States Patent
Berthelsen et al.

(10) Patent No.: US 9,531,433 B2
(45) Date of Patent: Dec. 27, 2016

(54) ECHO CANCELLATION METHODOLOGY AND ASSEMBLY FOR ELECTROACOUSTIC COMMUNICATION APPARATUSES

(71) Applicant: Analog Devices Global, Hamilton (BM)

(72) Inventors: Kim Spetzler Berthelsen, Koge (DK); Robert Adams, Acton, MA (US); Kasper Strange, Copenhagen O (DK)

(73) Assignee: ANALOG DEVICES GLOBAL, Hamilton (BM)

(*) Notice: Subject to any disclaimer, the term of this patent is extended or adjusted under 35 U.S.C. 154(b) by 0 days.

(21) Appl. No.: 14/175,480

(22) Filed: Feb. 7, 2014

(65) Prior Publication Data
US 2015/0229353 A1    Aug. 13, 2015

(51) Int. Cl.
H04M 9/08    (2006.01)
H04B 1/38    (2006.01)
H04B 3/23    (2006.01)

(52) U.S. Cl.
CPC ............... *H04B 3/23* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 2006/0034448 A1* | 2/2006 | Parry | 379/406.01 |
| 2012/0237047 A1 | 9/2012 | Neal et al. | |
| 2013/0003960 A1* | 1/2013 | Sollenberger | H04M 9/082 379/406.01 |
| 2013/0163748 A1* | 6/2013 | Khanduri | H04M 9/082 379/406.08 |
| 2013/0251164 A1* | 9/2013 | Gautama | H04R 29/001 381/59 |
| 2013/0251167 A1* | 9/2013 | Gautama | 381/66 |
| 2013/0329898 A1* | 12/2013 | Williams | H04R 9/022 381/59 |
| 2013/0336500 A1 | 12/2013 | Sudo | |

(Continued)

FOREIGN PATENT DOCUMENTS

CN        104837092 A       8/2015

OTHER PUBLICATIONS

Berthelsen et al., "Method of Estimating Diaphragm Excursion of a Loudspeaker", *unpublished* U.S. Appl. No. 14/073,324, filed Nov. 6, 2013, having inventors in common with the present application.

(Continued)

*Primary Examiner* — Fan Tsang
*Assistant Examiner* — Jeffrey Lytle
(74) *Attorney, Agent, or Firm* — Kenyon & Kenyon LLP

(57) ABSTRACT

A feedback cancellation assembly for an electroacoustic communication apparatus may include a signal transmission path for generation and emission of an outgoing sound signal to an external environment through an electrodynamic loudspeaker and a signal reception path comprising a microphone for generation of a microphone input signal corresponding to sound received from the external environment. The signal reception path may generate a digital microphone signal. The outgoing sound signal may be acoustically coupled to the microphone. An electronic feedback cancellation path may be coupled between a tapping node and a summing node to produce a feedback cancellation signal to the summing node.

22 Claims, 8 Drawing Sheets

(56) References Cited

U.S. PATENT DOCUMENTS

2015/0201294 A1* 7/2015 Risberg .................. H04R 3/002
  381/59

OTHER PUBLICATIONS

Pan et al., "Method of Controlling Sound Reproduction of Enclosure Mounted Loudspeakers", *unpublished* U.S. Appl. No. 14/059,153, filed Oct. 21, 2013, having inventors in common with the present application.
Dutch Search Report and Written Opinion dated Oct. 15, 2015 issued in corresponding Dutch Application No. 2014251, 8 pages.

* cited by examiner

A)

B)

ECHO CANCELLATION METHODOLOGY AND ASSEMBLY FOR ELECTROACOUSTIC COMMUNICATION APPARATUSES

FIELD OF THE INVENTION

The present invention relates to a feedback cancellation assembly for an electroacoustic communication apparatus. The feedback cancellation assembly comprises a signal transmission path for generation and emission of an outgoing sound signal to an external environment through an electrodynamic loudspeaker and a signal reception path comprising a microphone for generation of a microphone input signal corresponding to sound received from the external environment. The signal reception path generates a digital microphone signal corresponding to the microphone input signal at a summing node of the audio signal reception path. The outgoing sound signal is acoustically coupled to the microphone via an external feedback path having a constant or time-varying transfer function. An electronic feedback cancellation path of the feedback cancellation assembly is coupled between a tapping node of the signal transmission path and the summing node of the audio signal reception path to produce a feedback cancellation signal to the summing node. The electronic feedback cancellation path comprises a non-linear digital loudspeaker model comprising a plurality of loudspeaker parameters, including at least one non-linear loudspeaker parameter, derived from a voice coil current and/or a voice coil voltage of the electrodynamic loudspeaker. The least one non-linear loudspeaker parameter is represented by a non-linear function between the at least one non-linear loudspeaker parameter and a predetermined loudspeaker variable. The electronic feedback cancellation path comprises an adaptive digital filter coupled in series with the non-linear digital loudspeaker model and configured to model at least the constant or time-varying transfer function of the external feedback path.

BACKGROUND OF THE INVENTION

The present invention relates to a feedback or echo cancellation assembly and methodology that may be utilized to improve feedback cancellation performance in a wide range of electroacoustic communication apparatuses. The feedback or echo cancellation assembly may be utilized in portable communication devices such as smartphones, laptops, tablets and other types of audio enabled portable computing devices. The feedback or echo cancellation assembly may also be integrated in an electroacoustic communication apparatus of a motorized vehicle such as a car, i.e. an automotive application. In the latter case, the electroacoustic communication apparatus may form part of an in-car music entertainment and communication system with build-in hands-free speaker functionality. The feedback or echo cancellation assembly suppresses acoustic coupling via an external feedback path between a loudspeaker and a microphone of the electroacoustic communication apparatus by determining and adding an opposite phase feedback cancellation signal to a summing node of a signal reception path of the electroacoustic communication apparatus.

In prior art feedback or echo cancellation systems and methodologies, the feedback cancellation signal has typically been generated by a linear adaptive digital filter of an electronic feedback cancellation path. The linear adaptive digital filter models or tracks stationary and constant or time-varying frequency response characteristics of the external acoustic feedback path and produces the opposite phase feedback cancellation signal. While a suitably configured linear adaptive digital filter may be capable of accurately modelling characteristic of the external acoustic feedback path itself because the latter normally behave essentially linearly, the linear adaptive digital filter is unable to accurately model electrical, acoustic or electroacoustic components of the feedback or echo cancellation assembly of the electroacoustic communication apparatus that behave non-linearly within the desired operational range of signals. The lacking ability to accurately model the electrical, acoustic and electroacoustic components of the electroacoustic communication apparatus leads to an inaccurate feedback cancellation signal therefore deteriorating performance of the feedback cancellation assembly. The deteriorating the feedback cancellation performance may lead to various undesirable sonic artifacts of the reproduced sound such as echoes or instability in the electroacoustic communication apparatus.

Hence, there is a need for an improved feedback or echo cancellation assembly and methodology that are capable of accurately modelling non-linear behaviour of electrical, acoustic and electroacoustic components of a feedback cancellation assembly of electroacoustic communication apparatuses. An improved feedback or echo cancellation assembly capable of modelling at least a dominant non-linear component of the feedback or echo cancellation assembly, such as a loudspeaker, would be particularly advantageous. Loudspeakers, in particular electrodynamic loudspeakers, are generally highly non-linear devices at high sound pressure levels even within their nominal sound pressure output range. Hence, the loudspeaker will therefore often constitute the dominant non-linear component of the feedback or echo cancellation assembly.

The present invention provides an improved feedback or echo cancellation assembly by virtue of an electronic feedback cancellation path which comprises a non-linear digital loudspeaker model capable of accurately modelling the non-linear behaviour of the loudspeaker leading to significant improvement of the feedback cancellation performance. The non-linear digital loudspeaker model comprises at least one non-linear loudspeaker parameter derived from a voice coil current and/or a voice coil voltage of the loudspeaker. The at least one non-linear loudspeaker parameter is represented by a non-linear function between the at least one non-linear loudspeaker parameter for example a B*I product and a predetermined loudspeaker variable such as diaphragm excursion. The skilled person will understand that the non-linear digital loudspeaker model may comprise several non-linear loudspeaker parameters, represented by respective non-linear functions, to improve its accuracy to any desired performance level.

It is furthermore advantageous to provide a non-linear digital loudspeaker model that can be calibrated without requiring time-consuming and costly individual characterization of the behaviour of the non-linear loudspeaker parameter or parameters of each individual loudspeaker during manufacturing of the present feedback or echo cancellation assembly. It is also desirable to minimize the amount of computational resource expenditure of a digital signal processor implementing the non-linear function or functions of the non-linear digital loudspeaker model.

SUMMARY OF THE INVENTION

A first aspect of the invention relates to a feedback cancellation assembly for an electroacoustic communication apparatus. The feedback cancellation assembly comprises a signal transmission path for generation and emission of an outgoing sound signal to an external environment through an electrodynamic loudspeaker. The feedback cancellation assembly comprises a signal reception path comprising a microphone for generation of a microphone input signal corresponding to sound received from the external environment and generation of a corresponding digital microphone signal at a summing node of the audio signal reception path. The outgoing sound signal is acoustically coupled to the microphone via an external feedback path having a constant or time-varying transfer function. An electronic feedback cancellation path of the feedback cancellation assembly is coupled between a tapping node of the signal transmission path and the summing node of the signal reception path to produce a feedback cancellation signal to the summing node. The electronic feedback cancellation path comprises a non-linear digital loudspeaker model comprising a plurality of loudspeaker parameters, including at least one non-linear loudspeaker parameter, derived from a voice coil current and/or a voice coil voltage of the electrodynamic loudspeaker. The least one non-linear loudspeaker parameter is represented by a non-linear function between the at least one non-linear loudspeaker parameter and a predetermined loudspeaker variable. An adaptive digital filter of the feedback cancellation assembly is coupled in series with the non-linear digital loudspeaker model and configured to model at least the constant or time-varying transfer function of the external feedback path.

The present feedback cancellation assembly may be utilized in a wide range of electroacoustic communication apparatuses in various applications such as automotive or Public Address applications. The feedback or echo cancellation assembly may be integrated in a portable communication device such as smartphone, mobile phone or audio enabled tablet. The feedback or echo cancellation assembly may be integrated in an electroacoustic communication apparatus of a motorized vehicle such as a car, i.e. an automotive application.

The present feedback cancellation assembly provides improved feedback or echo cancellation by virtue of the non-linear digital loudspeaker model of the electronic feedback cancellation path capable of accurately modelling the non-linear behaviour of the electrodynamic loudspeaker. This non-linear modelling capability leads to significant improvement of the echo cancellation performance because the signal characteristics of the electronic feedback cancellation path more accurately model signal characteristics from the tapping node of the signal transmission path and through the electrodynamic loudspeaker and external feedback path back to the microphone. The feedback cancellation signal is preferably subtracted from the digital microphone signal at the summing node of the signal reception path to produce a feedback compensated microphone signal at the output of the summing node. The feedback compensated microphone signal is a digital signal that may be transmitted to a speech/voice input channel of the electroacoustic communication apparatus.

The skilled person will understand that the non-linear digital loudspeaker model may comprise two or more non-linear loudspeaker parameters, represented by respective non-linear functions, to improve the model accuracy to any desired performance level. Representing a large number of the plurality of loudspeaker parameters by respective non-linear functions will generally improve the accuracy of the computed values of the loudspeaker parameters in the non-linear digital loudspeaker model and thus improve accuracy of the echo cancellation. However, this improved accuracy may be reached at the cost of increased computational load. Consequently, the number of non-linear loudspeaker parameters may advantageously be tailored to certain application relevant performance requirements. In a preferred embodiment, the non-linear digital loudspeaker model comprises a non-linear state-space model of the electrodynamic loudspeaker. The skilled person will understand that the at least one non-linear function may form an integral part of the non-linear state-space model of the electrodynamic loudspeaker or may be computed by a separate pre-processing block or step before application to a linear state-space model of the loudspeaker. In the first embodiment, the non-linear function may be expressed as non-linear equation(s) of the non-linear state-space model. In the second embodiment, the non-linear function may be applied to the loudspeaker parameter value together with a corresponding value of the predetermined loudspeaker variable, e.g. diaphragm displacement or voice coil current, in the separate pre-processing block or step. In the latter case, the non-linear digital loudspeaker model is configured to compute least one non-linearity compensated value of the at least one non-linear loudspeaker parameter. This non-linearity compensated parameter value may subsequently be inputted to a linear state-space model of the electrodynamic loudspeaker as explained in additional detail below with reference to the appended drawings. The latter embodiment reduces the computational load associated with the computation of the non-linear state-space model.

The transfer function of the external feedback path may vary considerably depending on the particular type of electroacoustic communication apparatus in which the feedback cancellation assembly is integrated. The external feedback path may comprise an acoustic transfer function or a vibrational transfer function or a combination of both. The transfer function will often be time-varying if the feedback cancellation assembly is integrated in portable communication devices such as smartphones, tablets and other types of audio enabled portable computing devices because of time varying acoustics of the external environment for example reflections from the user's head and body. The same applies if the feedback cancellation assembly is integrated in a headset or hearing instrument. The adaptive digital filter models and tracks this time-varying property of the external feedback path. In other types of equipment the transfer function of the external feedback path may be substantially stationary but unknown in advance. In this case, the adaptive digital filter is capable of identifying and modelling the transfer function of the external feedback path and suppress feedback sound or vibration signals travelling from the loudspeaker to the microphone.

The plurality of loudspeaker parameters preferably comprise one or more loudspeaker parameter(s) selected from a group of {a force factor (B*I), a suspension compliance or stiffness, a voice coil resistance, a total mechanical damping, a total moving mass, a voice coil inductance}. Furthermore, at least one of the loudspeaker parameters is preferably adaptive to allow the non-linear digital loudspeaker model to track or model slowly time-varying changes of the value(s) of the loudspeaker parameter(s) in question. These slowly time-varying changes of loudspeaker parameter values are typically caused by changing environmental conditions and/or mechanisms such as material aging in the loudspeaker and/or changes in the acoustic loading of the loudspeaker (e.g. enclosure leakage). To determine or compute the adaptive loudspeaker parameter or parameters the non-linear digital loudspeaker model preferably comprises a linear adaptive digital loudspeaker model. The latter may comprise an adaptive IIR filter of second order, or of higher order, comprising a plurality of adaptable model parameters from which the parameter value or values of the adaptive loudspeaker parameter or parameters are derived. The adaptive IIR filter models or tracks a time varying and frequency dependent impedance of the loudspeaker across a predetermined audio frequency range, for example between 10 Hz and 10 kHz. The detected voice coil current and detected voice coil voltage are preferably represented by a digital voice coil current signal and a digital voice coil voltage, respectively, as explained in additional detail below with reference to the appended drawings. To assist proper adaptation of the linear adaptive digital loudspeaker model the latter preferably comprises at least one fixed loudspeaker parameter such as a total moving mass of the loudspeaker in addition to the one or more adaptable or free model parameters.

In one embodiment of the feedback cancellation assembly the non-linear function represents an individually measured non-linear function of the electrodynamic loudspeaker between the at least one non-linear loudspeaker parameter and the predetermined loudspeaker variable. The individually measured non-linear function may be measured or determined during a factory calibration of the feedback cancellation assembly when mounted in the electroacoustic communication apparatus. The non-linear function may therefore be determined by individual calibration measurements revealing the non-linear behaviour of the loudspeaker parameter or parameters in the particular electrodynamic loudspeaker of the feedback cancellation assembly. This kind of individual measurement of the non-linear function or functions process may provide a non-linear digital loudspeaker model with high accuracy. However, the individual calibration measurements may be to complex and time-consuming for certain types of mass produced and cost-sensitive electroacoustic communication apparatuses.

According to a number of alternative embodiments of the feedback cancellation assembly, the non-linear function represents an average non-linear relationship between the at least one non-linear loudspeaker parameter and the predetermined loudspeaker variable determined from non-linearity measurements on a plurality of representative electrodynamic loudspeakers. This may include between 5 and 50 representative electrodynamic loudspeakers of the same model as the one utilized in the feedback cancellation assemblies. The present inventors have recognized that the non-linear relationship between the at least one loudspeaker parameter and the predetermined loudspeaker variable is a relatively well-defined and time invariant relationship for a particular loudspeaker model. This is despite an often pronounced variation over time and temperature of the respective linear parameter values of the plurality of loudspeaker parameters and often large sample-to-sample variations of the same parameter values.

The use of a non-linear function which represents an average non-linear relationship between the at least one non-linear loudspeaker parameter and the predetermined loudspeaker variable allows the same non-linear function to be utilized in a plurality of feedback cancellation assemblies which incorporate the same loudspeaker model. Hence, eliminating the need for complex and time-consuming individual measurement of the non-linear function of the loudspeaker of each assembly.

The average non-linear function may be determined by different methodologies. In one embodiment, the non-linear function of each of the above-mentioned 5-50 representative electrodynamic loudspeakers of the same model is determined. The average non-linear function is subsequently determined in suitable computerized analysis tool, e.g. MATLAB, by simple averaging, or weighted averaging, over all measured non-linear loudspeaker parameter values for each value of the predetermined loudspeaker variable as described in additional detail below with reference to the drawings. In another embodiment, the average non-linear function is determined as median value of all measured non-linear loudspeaker parameter values for each value of the predetermined loudspeaker variable. In yet another embodiment, the average non-linear function may be represented by the non-linear function of a single but typical loudspeaker picked from a collection of representative loudspeakers. The collection may comprise between 5-50 representative electrodynamic loudspeakers on which the respective non-linear functions are determined and the single typical loudspeaker identified either manually or by a suitable algorithm. The description accompanying FIG. 7 below describes in additional detail how the average non-linear function may be determined for the specific non-linear function representing the force factor versus diaphragm displacement of the collection of representative loudspeakers.

Various loudspeaker variables may be selected as the predetermined loudspeaker variable of the non-linear functions or of each of the non-linear functions in view of the large number of complex non-linearities of electrodynamic loudspeakers. Naturally, the predetermined loudspeaker variable is preferably a variable which makes a significant contribution to the non-linear behaviour of the loudspeaker parameter in question. Hence, the predetermined loudspeaker variable preferably comprises the diaphragm excursion or displacement such that the predetermined non-linear function represents an excursion dependent non-linear behaviour of the electrodynamic loudspeaker because the diaphragm displacement typically makes a significant contribution to the non-linear behaviour of different loudspeaker parameters, in particular parameters such as force factor (B*l or Bl product), total mechanical compliance or stiffness, voice coil inductance etc.

Alternatively, or additionally, the predetermined loudspeaker variable may comprise a voice coil current since to this variable is a source of significant non-linearity of certain loudspeaker parameters such as the force factor.

According to another embodiment, the plurality of loudspeaker parameters comprise a total mechanical compliance or stiffness of the diaphragm and the predetermined non-linear function represents a measured excursion dependence of the total mechanical compliance or stiffness so as to provide a non-linearity compensated diaphragm suspension compliance or stiffness in the non-linear state space model of the electrodynamic loudspeaker. The skilled person will appreciate that the plurality of loudspeaker parameters may comprise both the force factor and the total mechanical compliance or stiffness represented by respective non-linear functions representing their respective measured excursion dependencies.

The signal transmission path of the feedback cancellation assembly may comprise a digital-to-analog converter and an output amplifier configured to apply the voice coil current and voltage of the electrodynamic loudspeaker from the audio signal at the tapping node; and/or the signal reception path may comprises a first A/D (analog-to-digital) converter configured to sample and digitize the microphone input signal to generate the digital microphone signal. The feedback cancellation assembly may comprise a second A/D converter configured to sample and digitize the voice coil voltage and/or the voice coil current. Hence, the skilled person will appreciate that each of the microphone input signal, the voice coil voltage, the voice coil current, the feedback cancellation signal and an audio signal at the tapping node may be represented by a digital signal, e.g. a sampled signal that is coded in binary format at a suitable sampling frequency or rate and resolution. The digital signals may have the same sampling frequency or different sampling frequencies. The sampling frequency of each digital signal may lie between 16 kHz and 96 kHz such as 32, 44.1 or 48 kHz etc. The resolution of each of these digital signals may lie between 16 and 32 bits.

The output amplifier may comprise a switching type or class D amplifier for example a Pulse Density Modulation (PDM) or Pulse Width Modulation (PWM) output amplifier which both possess high power conversion efficiency. This is a particularly advantageous feature for use in battery powered equipment. In the alternative, the output amplifier may comprise traditional non-switched power amplifier topologies like class A or class AB. The detection of the voice coil voltage may be accomplished by a direct measurement via the second A/D converter producing the digital voice coil signal or by indirect determination where the voice coil voltage is determined or estimated from a known level of an audio input signal to the signal transmission path, e.g. digitally represented, and a known DC supply voltage of the output amplifier.

The audio input signal to the signal transmission path may be provided as a digital audio input signal in some embodiments of invention as discussed above and as an analog audio input signal that is sampled and digitized after reception in other embodiments. According to an advantageous embodiment of the invention, the sampling frequency of the audio signal at the tapping node is reduced to a lower sampling frequency before application to the non-linear digital loudspeaker model. The sampling frequency may for example be reduced with an integer factor between 2 and 8. The reduced sampling frequency reduces the computational load incurred by the non-linear digital loudspeaker model so as to reduce power consumption of a signal processor. The skilled person will appreciate that the non-linear digital loudspeaker model and other signal processing functions of the feedback cancellation assembly may be implemented by a signal processor. The signal processor may comprise application specific digital hardware or a software programmable microprocessor core or DSP core. In the latter case, the non-linear digital loudspeaker model and other signal processing functions may be implemented by sets of executable program instructions, or program routines, executed on microprocessor core or DSP core. In some embodiments of the invention the signal processor may form an integral part of an application processor of the electroacoustic communication apparatus while the signal processor in other embodiments of the invention may be a dedicated microprocessor or DSP of the assembly.

A second aspect of the invention relates to a method of supressing feedback signals between a loudspeaker and a microphone of a loudspeaker of an electroacoustic communication apparatus. The method comprises steps of:
a) applying an audio signal to the loudspeaker through a signal transmission path to emit sound signal to an external environment,
b) transmitting the emitted sound signal through an external feedback path of the electroacoustic communication apparatus between the loudspeaker and the microphone to produce a filtered sound signal at the microphone,
c) receiving a filtered sound signal at the microphone and producing a corresponding digital microphone signal in a signal reception path,
d) tapping the audio signal from the signal transmission path,
e) determining one of a voice coil current and a voice coil voltage of the loudspeaker,
f) filtering the tapped audio signal by a non-linear digital loudspeaker model comprising a plurality of loudspeaker parameters, including at least one non-linear loudspeaker parameter, derived from the voice coil current and/or voice coil voltage,
wherein the least one non-linear loudspeaker parameter is represented by a non-linear function between the at least one non-linear loudspeaker parameter and a predetermined loudspeaker variable to produce a first feedback compensation signal estimating the loudspeaker sound pressure,
g) filtering the first feedback compensation signal by an adaptive digital filter modelling at least a constant or time-varying transfer function of the external feedback path to produce a second feedback compensation signal,
h) subtracting the second feedback compensation signal and the digital microphone signal to produce a feedback compensated microphone signal,
i) processing the feedback compensated microphone signal in the signal reception path.

The method may comprise an additional step of:
j) adapting a value of at least one loudspeaker parameter of the plurality of loudspeaker parameters over time based on the voice coil current and/or voice coil voltage of the loudspeaker.

At least one non-linear loudspeaker parameter is selected from a group of {a force factor (B*I), a suspension compliance or stiffness, a voice coil resistance, a total mechanical damping, a total moving mass, a voice coil inductance}.

As mentioned previously, the non-linear function may represent an average non-linear function between the least one non-linear loudspeaker parameter and the predetermined loudspeaker variable determined from measurements on a plurality, or collection, of representative electrodynamic loudspeakers, preferably of the same model.

The determination of the average non-linear function may comprise steps of:
a1) applying a test signal to each loudspeaker of a plurality of representative loudspeakers wherein the test signal is configured to excite a particular relationship between the at least one non-linear loudspeaker parameter and the predetermined loudspeaker variable across a predetermined range of the loudspeaker variable,
b1) recording a plurality of parameter values of the least one non-linear loudspeaker parameter across the predetermined range of the loudspeaker variable for each loudspeaker of the plurality of representative loudspeakers,
c1) normalizing the plurality of recorded parameter values of the least one non-linear loudspeaker parameter for each loudspeaker at a common reference value of the predetermined loudspeaker variable,
d1) computing an average value of the plurality of normalized parameter values of the loudspeaker variable for the plurality of representative loudspeakers across the predetermined range of the loudspeaker variable for representing the average non-linear function between the least one non-linear loudspeaker parameter and the loudspeaker variable.

Normalizing the plurality of recorded parameter values according to step c1) may comprise:
increasing or decreasing each of the plurality of recorded parameter values for each loudspeaker at the common reference value of the loudspeaker variable such that all parameter values of the loudspeaker parameter are substantially equal at the common reference value. The reference value of the predetermined loudspeaker variable is preferably zero diaphragm excursion.

The least one non-linear loudspeaker parameter may comprises one of a force factor (B*I) and a suspension compliance or stiffness of the plurality of representative loudspeakers; and
the predetermined loudspeaker variable comprises a diaphragm excursion or displacement of the plurality representative loudspeakers.

A third aspect of the invention relates to the above-mentioned portable communication device comprising a feedback cancellation assembly according to any of the above-described embodiments thereof.

A fourth aspect of the invention relates to a motorized vehicle comprising a passenger cabin having mounted therein a feedback cancellation assembly according to any of the above-described embodiments thereof.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
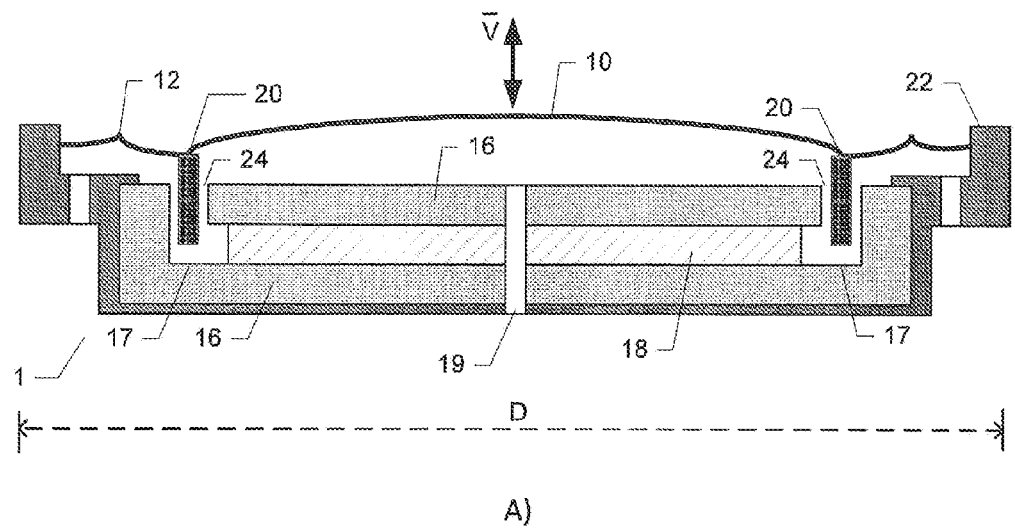
FIG. 1A) is a schematic cross-sectional view of an exemplary miniature electrodynamic loudspeaker suitable for use in feedback cancellation assemblies in accordance with the present invention, FIG. 1B) is a schematic cross-sectional view of the exemplary miniature electrodynamic loudspeaker mounted in a typical enclosure.
Figure 1:
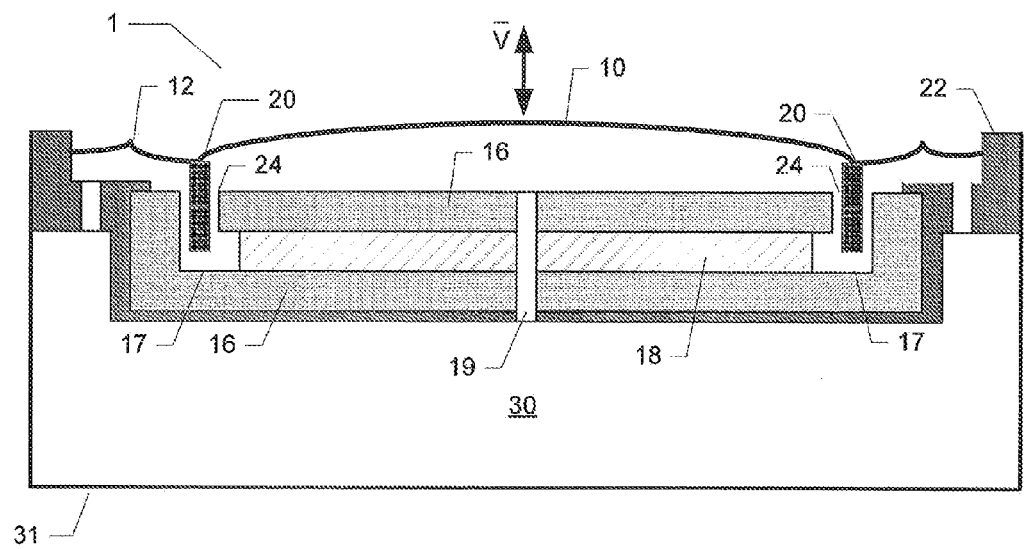

FIG. 1A) is a schematic cross-sectional illustration of a typical miniature electrodynamic loudspeaker 1 for sealed box mounting and use in portable audio applications such as mobile phones and smartphones where the loudspeaker 1 provides sound reproduction for various types of applications such as automotive sound reproduction, speaker phone and music playback. The skilled person will appreciate that electrodynamic loudspeakers exist in numerous shapes and sizes depending on the intended application. The electrodynamic loudspeaker 1 used in the below described methodologies of estimating diaphragm excursion and the corresponding assemblies for estimating diaphragm excursion has a rectangular shape with maximum outer dimension, D, of approximately 15 mm and an outer dimension in transversal direction of about 11 mm. However, the skilled person will appreciate that the present methodologies for estimating diaphragm excursion of electrodynamic loudspeakers are applicable to virtually all types of electrodynamic loudspeakers. The miniature electrodynamic loudspeaker 1 comprises a diaphragm 10 fastened to an upper edge surface of a voice coil. The diaphragm 10 is also mechanically coupled to a speaker frame 22 through a resilient edge or outer suspension 12. An annular permanent magnet structure 18 generates a magnetic flux which is conducted through a magnetically permeable structure 16 having a circular air gap 24 arranged therein. A circular ventilation duct 19 is arranged in the frame structure 22 and may be used to conduct heat away from an otherwise sealed chamber structure formed beneath the diaphragm 10. The resilient edge suspension 12 provides a relatively well-defined compliance of the movable diaphragm assembly (voice coil 20 and diaphragm 10). The compliance of the resilient edge suspension 12 and a moving mass of the diaphragm 10 determines the free-air fundamental resonance frequency of the miniature loudspeaker. The resilient edge suspension 12 may be constructed to limit maximum excursion or maximum displacement of the movable diaphragm assembly. During operation of the miniature loudspeaker 1, a voice coil voltage or drive voltage is applied to the voice coil 20 of the loudspeaker 100 thorough a pair of speaker terminals (not shown) electrically connected to a suitable output amplifier or power amplifier. A corresponding voice coil current flows in response through the voice coil 20 leading to essentially uniform vibratory motion, in a piston range of the loudspeaker, of the diaphragm assembly in the direction indicated by the velocity arrow V. Thereby, a corresponding sound pressure is generated by the loudspeaker 1. The vibratory motion of the voice coil 20 and diaphragm 10 in response to the flow of voice coil current is caused by the presence of a radially-oriented magnetic field in the air gap 24. The applied voice coil current and voltage lead to power dissipation in the voice coil 20 which heats the voice coil 20 during operation. Hence, prolonged application of too high drive voltage and current may lead to overheating of the voice coil 20 which is another common cause of failure in electrodynamic loudspeakers.

The application of excessively large voice coil currents which force the movable diaphragm assembly beyond its maximum allowable excursion limit is another common fault mechanism in electrodynamic loudspeakers leading to various kinds of irreversible mechanical damage. One type of mechanical damage may for example be caused by collision between the lowermost edge of the voice coil 20 and an annular facing portion 17 of the magnetically permeable structure 16. The maximum excursion of a particular type of electrodynamic loudspeaker depends on its dimensions and construction details. For the above-discussed miniature loudspeaker 1 with outer dimensions of approximately 11 mm×15 mm, the maximum allowable diaphragm excursion is typically about +/−0.45 mm.

FIG. 1B) is a schematic cross-sectional illustration of the miniature electrodynamic loudspeaker 1 mounted in an enclosure, box or chamber 31 having a predetermined interior volume 30. The enclosure or chamber 31 is arranged below the diaphragm 10 of the loudspeaker 1. An outer peripheral wall of the frame structure 22 of the loudspeaker 1 is firmly attached to a mating wall surface of the sealed box 31 to form a substantially air tight coupling acoustically isolating the trapped air inside volume 30 from the surrounding environment. The enclosed volume 30 may be between 0.5 and 2.0 cm$^3$ such as about 1 cm$^3$ for typical portable communication device or terminal applications like mobile phones and smartphones. The skilled person will appreciate that the present invention can be used to improve the accuracy of a feedback cancellation assembly using the loudspeaker for sound reproduction in different types of applications and acoustic mounting arrangements.

The mounting of the loudspeaker 1 in the sealed enclosure 30 leads to a higher fundamental resonance frequency of the miniature loudspeaker than its free-air fundamental resonance frequency discussed above due to a compliance of the trapped air inside the chamber 30. The compliance of the trapped air inside the chamber 30 works in parallel with the compliance of the resilient edge suspension 12 to decrease the total compliance (i.e. increase the stiffness) acting on the moving mass of the loudspeaker. Therefore, the fundamental resonance frequency of the enclosure mounted loudspeaker 1 is higher than the free air resonance. The amount of increase of fundamental resonance frequency depends on the volume of the enclosure 30. The wall structure surrounding the sealed enclosure 31 may be a formed by a molded elastomeric compound with limited impact strength.

Figure 2:
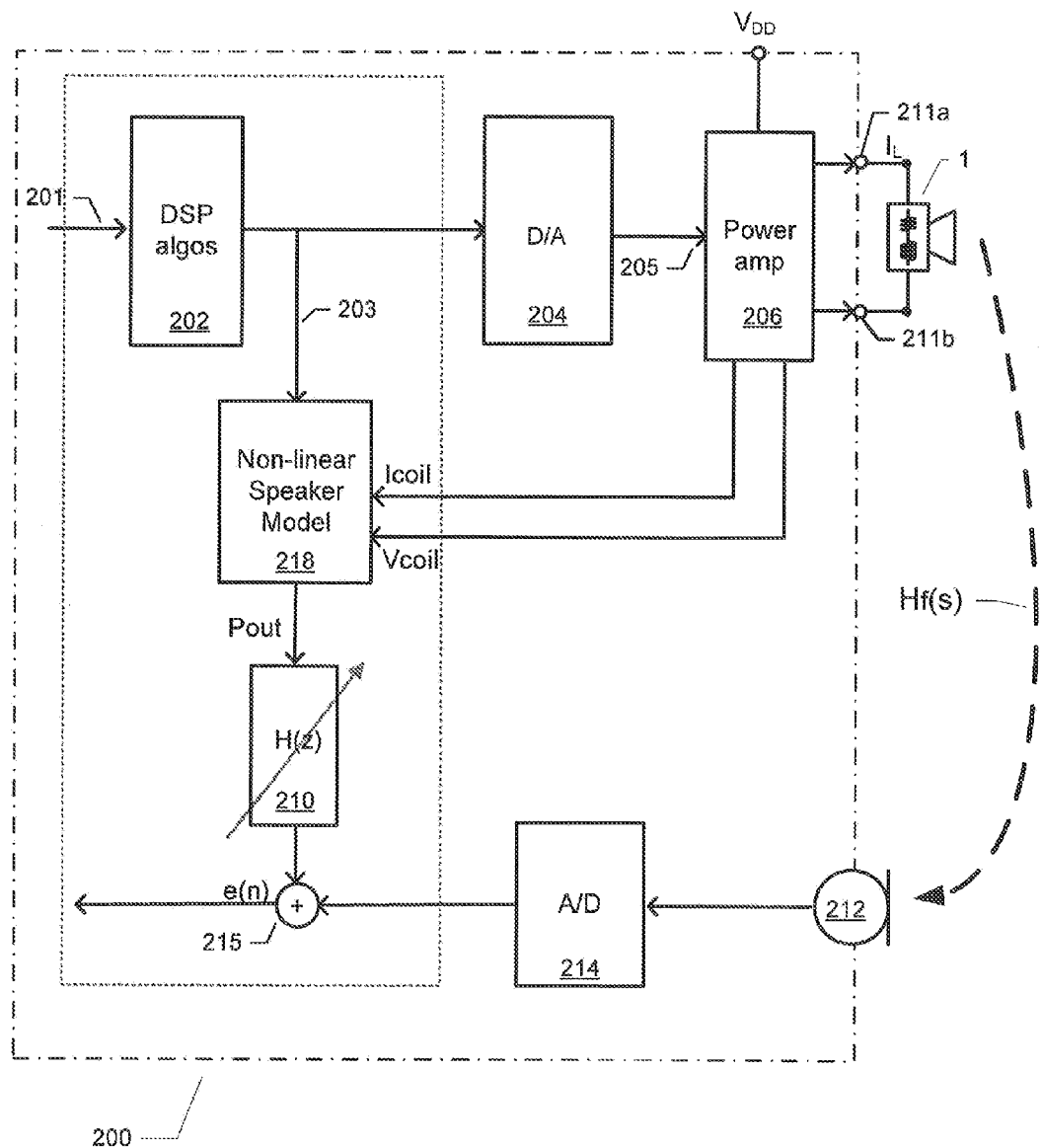
FIG. 2 shows a schematic block diagram of a in feedback cancellation assembly in accordance with a first embodiment of the invention.

FIG. 2 is a simplified schematic block diagram of a feedback or echo cancellation assembly 200 that may be utilized to improve feedback cancellation performance in a wide range of electroacoustic communication apparatuses. The feedback or echo cancellation assembly 200 may be utilized in portable communication devices, such as smartphones, tablets and other types of audio enabled portable computing devices. The feedback or echo cancellation assembly may also be integrated in an electroacoustic communication apparatus of a motorized vehicle such as a car, i.e. automotive application. In the latter case, the electroacoustic communication apparatus may form part of an in-car music entertainment and telecommunications system with build-in hands-free speaker functionality. The illustrated microphone 212 may accordingly be arranged in a vehicle cabin for voice pick-up in the telecommunications system. The echo cancellation assembly 200 may for example be integrated in a head unit of the in-car music entertainment and telecommunications system where voice coil currents and/or a voice coil voltages of one or more electrodynamic loudspeaker(s) can be monitored or sampled by the echo cancellation assembly 200.

The skilled person will understand that other types of loudspeakers than the present electrodynamic loudspeaker, for example piezoelectric or moving armature loudspeakers, may be used in the present echo cancellation assembly together with a corresponding non-linear digital loudspeaker model thereof.

The echo cancellation assembly 200 comprises a signal transmission path for generation and transmission of an outgoing sound signal from the electrodynamic loudspeaker 1. The signal transmission path comprises a power amplifier 206 coupled to the electrodynamic loudspeaker 1 through a pair of externally accessible speaker terminals 211a, 211b. The power amplifier 206 may comprise a pulse modulated Class D output amplifier based on H-bridge output stage supplying the audio output signal in pulse modulated format across a voice coil of the loudspeaker through the speaker terminals 211a, 211b. The class D output amplifier receives an analog audio signal at amplifier input 205, derived from a digital audio input signal supplied at digital audio signal input 201 of the assembly 200. The digital audio input signal may be supplied by an external digital audio signal source at a first sampling frequency e.g. a sampling frequency between 16 kHz and 96 kHz. The external digital audio signal source may comprise a digital audio port or interface of an application processor of a portable communication device in which the present assembly 200 is integrated. The externally generated digital audio signal may be formatted according to a standardized serial data communication protocol such as I$^2$C or SPI, or formatted according to a digital audio protocol such as I$^2$S, SPDIF etc. The signal transmission path also comprises a signal processing block 202 which comprises one or more digital signal processing algorithms which are applied to the digital audio input signal at the input 201. These digital signal processing algorithms may implement functions such as frequency response shaping, dynamic range compression, noise reduction etc. A processed digital audio signal is supplied by the signal processing block 202 to a tapping point or node 203 of the signal transmission path. The processed digital audio signal is both applied to a digital-to-analog converter 204 and to a non-linear digital loudspeaker model 218. The digital-to-analog converter 204 converter converts the processed digital audio signal into the corresponding analog audio signal and supplies the latter to the input of the power amplifier 206 as discussed above. The skilled person will understand that the digital-to-analog converter 204 and power amplifier 206 may be integrally formed in other embodiments of the invention in the form of digital power amplifier.

The feedback or echo cancellation assembly 200 further comprises a microphone 212 forming a front-end of a signal reception path of the assembly 200. The microphone 212 may comprise a condenser microphone such as a low-cost miniature electret or MEMS microphone for telecommunication devices. The outgoing sound signal produced by the loudspeaker 1 is acoustically coupled to the microphone 212 via an external feedback path $H_f(s)$ as schematically illustrated by the dotted arrow on the drawing. Characteristics of the external feedback path $H_f(s)$ will vary considerably depending on the type of electroacoustic communication apparatus in which the present feedback or echo cancellation assembly 200 is integrated. If the electroacoustic communication apparatus is a smartphone, the distance between the loudspeaker 1 and the microphone 212, or more accurately the distance between the respective sound ports, may lie between 5 and 15 cm and extend along a relatively hard outer surface of the smartphone. If the electroacoustic communication apparatus is mounted in the previously discussed car cabin, the external feedback path between the loudspeaker 1 and the microphone 212 may be considerably longer and generally comprise numerous reflective surfaces of structures of the car cabin. However, in both cases, the external feedback path will possess a constant but unknown transfer function or a time-varying transfer function. In both cases the transfer function is influenced by factors such as varying reflections from the user's head, hand and body when the user is in motion. The sound signal at the microphone 212 therefore comprises a filtered component, i.e. filtered by the time-varying transfer function of the external feedback path, of the outgoing sound signal of the loudspeaker 1. In addition, the sound signal at the microphone 212 may comprise voice and/or noise sound components produced by a user of the electroacoustic communication apparatus.

The external feedback path can also comprise contributions from various types of mechanical coupling and/or electrical coupling between the loudspeaker 1 and the microphone 212. The latter may for example be vibration sensitive such that mechanical vibrations of the loudspeaker under sound production are coupled to the microphone via a mechanical coupling path of the external feedback path. The presence of the external feedback path is generally unwanted because it introduces echoes in direct sound components received via the microphone and may cause the electroacoustic communication apparatus to self-oscillate provided the loop gain and phase shift are sufficiently large.

To eliminate, or at least attenuate the unwanted acoustic/mechanical/electrical coupling between the loudspeaker 1 and the microphone 212, the feedback or echo cancellation assembly 200 further comprises an electronic feedback cancellation or suppression path which generates a feedback cancellation signal which is injected in the signal reception path at a summing node 215 thereof. The electronic feedback cancellation path extends from the tapping node 203 of the signal transmission path and the summing node. The electronic feedback cancellation path comprises a cascade of the previously discussed non-linear digital loudspeaker model 218 and an adaptive digital filter 210 coupled in series with the non-linear digital loudspeaker model. The adaptive digital filter is a linear filter that is configured to model or track at least the time-varying transfer function of the external feedback path $H_f(s)$. The adaptive digital filter 210 may additionally model certain linear transfer functions of circuits and components of the signal reception path and signal transmission path between the tapping node 203 and the summing node 215 such as the power amplifier 206, microphone 212, an analog-to-digital converter 214, etc. The adaptive digital filter preferably comprises a FIR type filter which may conveniently be controlled by a LMS algorithm. The error signal may be bandpass filtered to improve direct the adaptation of the FIR filter to a pass band of the bandpass filter where the echo/feedback problem exists. In certain application an adaptive IIR filter may be used with good results if appropriate attention to its stability is taken. In both cases, the adaptive filter is seeking to minimize the value of an error signal, $e(n)$, at the output of the summing node 215.

However, the linear property of the adaptive digital filter 210 makes the latter incapable of accurately model non-linear properties of any of the circuits and components of the signal reception path and the signal transmission path between the tapping node 203 and the summing node 215. While some of these circuits and components may behave essentially linearly within normally encountered levels of the various audio signals of the feedback cancellation assembly 200, the loudspeaker 1 often fails to behave essentially linear under these circumstances. Loudspeakers are generally highly non-linear at high sound pressure levels within their expected operational output range. This non-linear behaviour cannot be accurately modelled by the linear adaptive digital filter 210 which has the effect that the feedback compensation signal supplied to the summing node 215 at the output of the linear adaptive digital filter 210 is inaccurate. Consequently, the feedback cancellation performance of the feedback or echo cancellation assembly 200 rapidly deteriorates and audible echoes or self-oscillation may be induced.

To address and eliminate this problem, the electronic feedback cancellation path comprises the non-linear digital loudspeaker model 218 capable of effectively and accurately modelling the above discussed non-linear behaviour of the loudspeaker 1. The non-linear digital loudspeaker model 218 comprises a plurality of loudspeaker parameters which are derived from a voice coil current Icoil and/or a voice coil voltage Vcoil of the electrodynamic loudspeaker 1 as schematically illustrated on FIG. 2. The plurality of loudspeaker parameters may comprise one or more of loudspeaker parameters like a force factor (B*I), a suspension compliance or stiffness, a voice coil resistance, a total mechanical damping, a total moving mass, a voice coil inductance etc. derived from a voice coil current and/or a voice coil voltage of the electrodynamic loudspeaker. The non-linear digital loudspeaker model 218 furthermore comprises a non-linear loudspeaker parameter derived from the voice coil current and/or voice coil voltage of the electrodynamic loudspeaker. The non-linear loudspeaker parameter is represented by a non-linear function between the non-linear loudspeaker parameter and a predetermined loudspeaker variable. The non-linear loudspeaker parameter is preferably one of the above-mentioned plurality of loudspeaker parameters; in particular a loudspeaker parameter that a priori is known to behave highly non-linearly for the selected type of loudspeaker variable. The selected non-linear loudspeaker parameter may therefore constitute a dominant non-linear distortion mechanism of the loudspeaker 1.

The residual loudspeaker parameters may be linear loudspeaker parameters and either fixed or adaptive, i.e. time varying as discussed below in further detail. The non-linear loudspeaker parameter may for example be a force factor (B*I) or a suspension compliance/stiffness of loudspeaker and the loudspeaker variable may be the diaphragm excursion or displacement. Both of these loudspeaker parameters exhibit a pronounced excursion dependent behaviour or property such that a value of the force factor often decreases with increasing diaphragm excursion of displacement for a typical loudspeaker design or construction. Likewise, the value of the suspension compliance often decreases with increasing diaphragm excursion for typical loudspeaker constructions. The output of the non-linear digital loudspeaker model 218 is a first feedback compensation signal, Pout, which models, represents or estimates the outgoing sound signal or pressure emitted by the loudspeaker 1 taking the non-linear behaviour of the loudspeaker into proper account. Hence, the non-linear digital loudspeaker model 218 provides, to the electronic feedback cancellation path, a dedicated and highly accurate model of the outgoing sound signal generated by the loudspeaker 1 including both linear and non-linear loudspeaker characteristics. Therefore, the electronic feedback cancellation path is capable of maintaining an accurate model of the external feedback path of the assembly between the tapping node 203 and the summing node 215 even when the loudspeaker behaves non-linearly for example due to a high sound pressure level.

The feedback cancellation assembly 200 is supplied with operating power from a positive power supply voltage $V_{DD}$. Ground (not shown) or a negative DC voltage may form a negative supply voltage for the feedback cancellation assembly 200. The DC voltage of $V_{DD}$ may lie between 1.5 Volt and 100 Volt and may hence vary considerably depending on the particular application of the feedback cancellation assembly 200.

In a further refined embodiment of the non-linear digital loudspeaker model 218 one or more of the plurality of loudspeaker parameters is/are adaptive allowing the latter to track slow changes of the loudspeaker parameters over time as explained in further detail below with reference to the detailed schematic block diagram on FIG. 3 of selected signal processing functions and block of the non-linear digital loudspeaker model 218.

Figure 3:
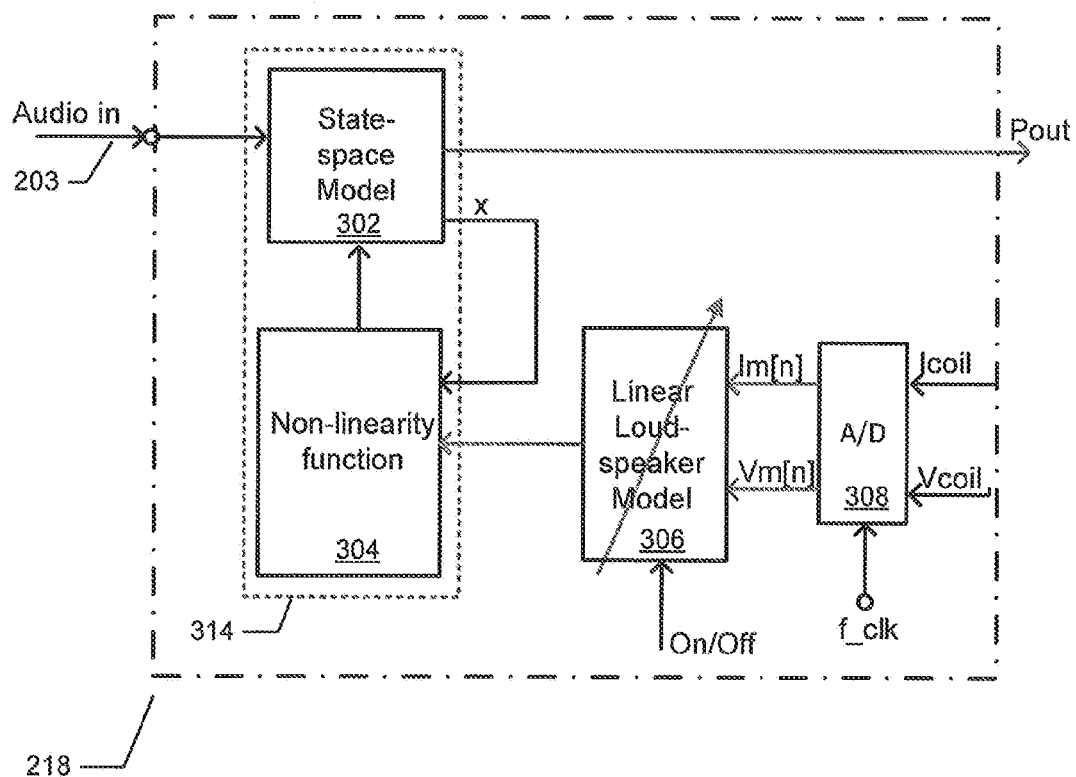
FIG. 3 shows a detailed schematic block diagram of selected signal processing functions and block of a non-linear digital loudspeaker model of the feedback cancellation assembly depicted on FIG. 2.

FIG. 3 shows a detailed schematic block diagram of signal processing functions and blocks of the non-linear digital loudspeaker model 218 of the feedback cancellation assembly 200 depicted on FIG. 2. The non-linear digital loudspeaker model 218 comprises a non-linear state-space model 314 of the electrodynamic loudspeaker 1. The non-linear state-space model 314 comprises a combination of a linear state-space model 302 and a non-linear function block 304 as explained in detail below. The non-linear digital loudspeaker model 218 further comprises a linear adaptive digital loudspeaker model 306 of the electrodynamic loudspeaker 1 comprising a plurality of adaptable or adaptive model parameters that are adjusted in response to a digital voice coil current signal Im[n] and a digital voice coil voltage Vm[n]. The linear adaptive digital loudspeaker model 306 computes the above discussed one or more of adaptable loudspeaker parameter(s) of the plurality of loudspeaker parameters and supplies these/this parameter(s) to the non-linear function block 304 if the non-linear function is applied to the loudspeaker parameter in question. Alternatively, a current value of the loudspeaker parameter may be passed directly from the linear adaptive digital loudspeaker model 306 to the linear state-space model 302 if there is no non-linear function associated with the loudspeaker parameter in question.

The linear adaptive digital loudspeaker model 306 of the loudspeaker preferably comprises an adaptive filter which models a frequency dependent impedance of the loudspeaker 1 across a predetermined audio frequency range, for example between 10 Hz and 10 kHz, based on the detected or measured voice coil current and voice coil voltage as represented by the digital voice coil current signal Im[n] and the digital voice coil voltage Vm[n]. The linear adaptive digital loudspeaker model 306 comprises a plurality of adaptive parameters. The linear adaptive digital loudspeaker model 306 is configured for computing a plurality of respective parameter values of the linear loudspeaker parameters. The details of the functionality of the adaptive linear digital loudspeaker model 306 are discussed in further detail below with reference to FIG. 4. The adaptive linear digital loudspeaker model 306 may for example be configured to computing or tracking a time-varying impedance versus frequency function of the electrodynamic loudspeaker 1. The respective parameter values of various important linear loudspeaker parameters may be derived from the values of the time-varying model parameters tracking the impedance function or curve of the loudspeaker 1. The output of the linear adaptive digital loudspeaker model 306 comprises a plurality of parameter values of the respective linear, albeit time-varying, adaptive loudspeaker parameters, for example a force factor or suspension compliance of the loudspeaker. Hence, the parameter values of the adaptive loudspeaker parameters represent or estimate respective current parameter values of the respective adaptive loudspeaker parameter such that the previously discussed time-varying and temperature varying properties of each of these are appropriately tracked in the non-linear state-space model 314 of the loudspeaker.

For the purpose of delivering the digital voice coil current signal Im[n] and a digital voice coil voltage signal Vm[n] to the linear adaptive digital loudspeaker model 306, the non-linear digital loudspeaker model 218 comprises at least one A/D converter 308 that generates the digital voice coil current signal Im[n] and a digital voice coil voltage signal Vm[n] by sampling and digitizing the instantaneous voice coil voltage across the speaker terminals (FIG. 2 items 211a, 211b). The A/D converter 308 furthermore comprises a second input that is configured to sample and digitize an analog voice coil current delivered at a second input, Icoil, of the converter 308. The digital voice coil current signal Im[n] and the digital voice coil voltage signal Vm[n] are preferably sampled at the same sampling frequency which may be identical to a first sampling frequency of the digital audio input signal such as 16 kHz, 32 kHz, 44.1 kHz, 48 kHz or 96 kHz etc. The sampling frequency of the digital voice coil current signal Im[n] and the digital voice coil voltage signal Vm[n] may alternatively be lower than the first sampling frequency for example less than one-half thereof to reduce the computational load on a digital signal processor implementing the adaptive linear digital model 306 in the non-linear digital loudspeaker model 218. The skilled person will appreciate that the least one A/D converter 308 may comprise a multiplexed type of converter alternatingly sampling the voice coil voltage and analog voice coil current signal. Alternatively, the least one A/D converter 308 may comprise two separate A/D converters fixedly coupled to the voice coil voltage and the voice coil current signal, respectively. The skilled person will appreciate that the voice current signal may be generated by various types of current sensors that generate a voltage, current or charge signal proportional to the instantaneous voice coil current flowing the voice coil.

In the non-linear function block 304, respective non-linear functions are preferably applied to one or more of the incoming parameter values of the adaptive loudspeaker parameters to compute one or more corresponding non-linearity compensated parameter values. The non-linearity compensated parameter value(s) takes into account the previously discussed non-linear behaviour or property of the loudspeaker parameter(s) in question relative to a particular loudspeaker variable. This could for example be the non-linear function between the force factor (B*I) of the loudspeaker and the diaphragm displacement or a non-linear relationship between the voice coil inductance ($L_e$) and the voice coil current etc. Clearly, just a few or a single one of the incoming parameter values of the adaptive loudspeaker parameters supplied by the adaptive linear digital model 306 may be subjected to the non-linear function(s) and respective non-linearity compensated parameter value(s) computed in response. The residual incoming parameter values of the residual adaptive loudspeaker parameters may be left without non-linear compensation and transmitted directly in the linear state-space model 302 in effect bypassing the non-linear parameter block 304 as discussed above. The skilled person will appreciate that utilizing a large number of non-linear functions in the non-linear function block 304 will generally improve the accuracy of the computed loudspeaker parameter values in the non-linear state-space model 314. This improved accuracy may however be reached at the cost of increasing computational load. Consequently, the accuracy requirements for the estimation of the loudspeaker sound pressure will vary between different types of applications and user requirements such that the number of non-linear functions applied in the non-linear function block 304 may be tailored to the application specific requirements. The linear state-space model 302 computes a displacement signal, x, that estimates the instantaneous diaphragm displacement in addition to the previously discussed first feedback compensation signal, Pout, represents the outgoing sound signal or pressure emitted by the loudspeaker 1. The displacement signal, x, is fed back to a second input of the non-linear function block 304 to allow the latter to calculate updated non-linearity compensated parameter value(s) based on a previous value of x.

The characteristics of each of the non-linear functions of the non-linear function block 304 have preferably been determined in connection with certain experimental measurements on a suitable set or collection of representative electrodynamic loudspeakers of the same make and model as the active loudspeaker 1. The individually determined non-linear relationship between the selected loudspeaker variable and the loudspeaker parameter in question has been measured for each loudspeaker sample during the calibration measurements. The average non-linear functional relationship across the batch of representative electrodynamic loudspeakers has been determined as described in additional detail below. This average non-linear functional relationship may be defined by various types of non-linear functions such as one or more polynomial coefficient(s) representing a polynomial curve fit between the selected loudspeaker variable and the loudspeaker parameter in question. In another embodiment, the average non-linear functional relationship may be defined by a look-up table which maps the loudspeaker variable into corresponding non-linearity compensated values of the loudspeaker parameter. Hence, the non-linear functions may comprise a plurality of look-up tables utilized to map the computed average non-linear functional relationships between the loudspeaker variable and the respective non-linearity compensated parameter values of the loudspeaker parameters. The look-up table or tables may be stored in a suitable non-volatile memory address space of the sound reproduction assembly or at least a non-volatile memory space accessible for reading by the DSP of the sound reproduction assembly. In the latter situation, the skilled person will appreciate that the non-volatile memory address space of may be situated in a data memory device of an application processor of the portable communication device. In both instances, the content of the look-up table or tables is preferably read into the non-linear function block 304 from the appropriate non-volatile memory address space for example in connection with initialization of the non-linear digital loudspeaker model 218.

The use of these non-linear functions representing respective average non-linear relationships between the selected loudspeaker variable and the loudspeaker parameter in question in the non-linear digital loudspeaker model 218 is advantageous as it eliminates the need to make complex individual calibration measurements to determine the non-linear behaviour of the loudspeaker parameter or parameters on each individual loudspeaker during manufacturing of the electroacoustic communication apparatus.

A beneficial effect of the adaptive or tracking property of the respective parameter values of the plurality of linear loudspeaker parameters computed by the adaptive linear digital model 306 is that the linear, albeit time-varying, loudspeaker model remains accurate over time despite changes of the linear loudspeaker parameters caused by varying environmental operating conditions such as humidity and temperature. Likewise, changes of the linear loudspeaker parameters caused by other mechanisms such as material aging in the loudspeaker and/or changes of its acoustic operating conditions (e.g. enclosure leakage) can be accurately modelled. The adaptive linear digital loudspeaker model 306 is capable of tracking such relatively slowly varying changes of the parameter values of the adaptive loudspeaker parameters. On the other hand, to make an accurate determination of the instantaneous sound pressure of the loudspeaker diaphragm despite large signal non-linear behaviour as described earlier, it remains highly advantageous to use the non-linear model of the loudspeaker in accordance with the present invention. The latter feature makes it feasible to accurately predict or estimate the instantaneous sound pressure emitted at the loudspeaker diaphragm in the electronic feedback cancellation path and therefore ascertain that the first compensation signal supplied to the summing node is an accurate representation of both linear and non-linear effects of the feedback path such that the feedback suppression remains effective despite pronounced non-linearities of the relevant loudspeaker parameters.

The digital audio input signal 203 is applied to a third input of the non-linear state-space model 314 and the state-space model 302 estimates the instantaneous diaphragm excursion, x, and the diaphragm acceleration or sound pressure, Pout, based on the digital audio input signal, the parameter values and non-linearity compensated parameter value(s) of the adaptive loudspeaker parameters. The digital audio input signal 203 may be scaled in accordance with a DC supply voltage of the power amplifier 206 such that the digital audio signal accurately represents the actual voice coil voltage. This scaling can be accomplished due to the known relationship between the magnitude of the digital audio input signal and the magnitude of voice coil voltage. The state-space model 302 may supply the instantaneous diaphragm excursion, x, to an optional amplitude or level limiter function of the of the feedback cancellation assembly 200 that is configured to avoid mechanical damage of the loudspeaker from excessively large voice coil voltages and currents. The level limiter function may compare the estimated instantaneous diaphragm excursion, x, with a predetermined excursion limit or threshold which indicates a maximum allowable or recommended diaphragm displacement or excursion for the particular type of loudspeaker. Hence, the maximum allowable or recommended diaphragm displacement may be set according to the loudspeaker manufacturer's recommendations. If the instantaneous diaphragm excursion, x, is smaller than the predetermined excursion limit, the level limiter function may transmit the digital audio input signal to the input of the output amplifier 206 without attenuation or level limiting. On the other hand, if the instantaneous diaphragm excursion, x, exceeds the predetermined excursion limit, the level limiter function is adapted to attenuate or limit the digital audio input signal before transmission to the power amplifier. The attenuation is preferably accomplished by selectively attenuating a low-frequency sub-band of the delayed digital audio input signal such as a low-frequency band below 800 Hz or 500 Hz while higher frequencies remain un-attenuated. This is often very effective for protection purposes because low-frequency audio signal components are most likely to drive the loudspeaker diaphragm outside its maximum allowable excursion limit. The low-frequency band may comprise all frequencies below a certain threshold frequency such as 800 Hz or 500 Hz or only a single low-frequency band such as one-third octave band around a center frequency such as 400 Hz or 300 Hz in the low-frequency range. The low frequency band depends on the speaker type and more specific on the resonance frequency of the speaker.

The skilled person will appreciate that each of the above discussed signal processing circuits, functions or models 202, 210, 218, 302, 304 and 306 may be implemented as a set of executable program instructions, or program routines, executed on a software programmable microprocessor core or DSP core. The skilled person will understand that the programmable DSP core may be integrated together with the previously discussed application processor of the portable communication terminal or be implemented as a separate programmable DSP core configured to perform the above-described signal processing functions or models. The skilled person will understand that one or more of the signal processing circuits, functions or models 202, 210, 218, 302, 304 and 306 may be implemented as respective sets of executable program instructions while any residual signal processing circuits, functions or models may be implemented as a separate hard-wired digital logic circuits comprising appropriately configured sequential and combinatorial digital logic. The hard-wired digital logic circuit may be integrated on an Application Specific Integrated Circuit (ASIC) or configured by programmable logic or any combination thereof.

Figure 4:
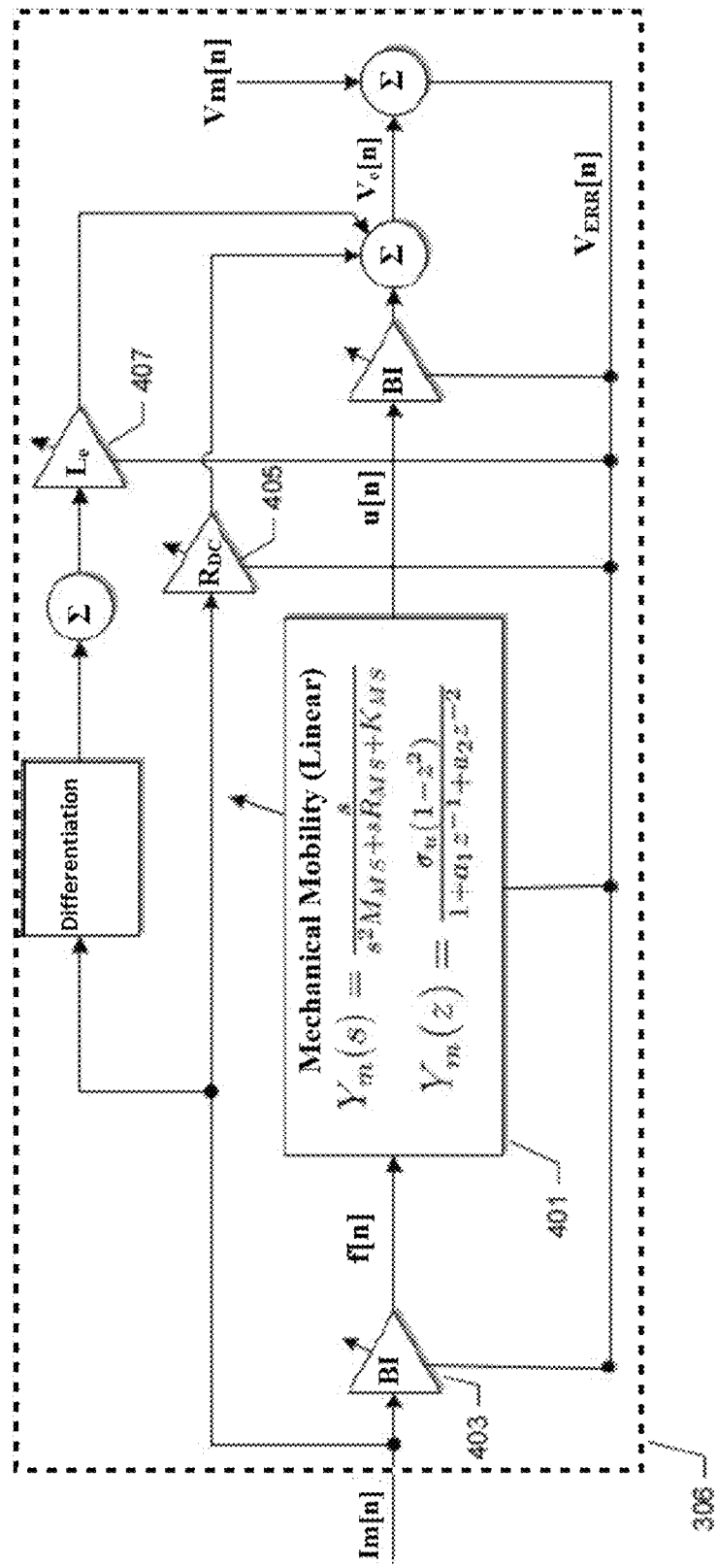
FIG. 4 shows an adaptive IIR filter based impedance model of the electrodynamic loudspeaker for determination of a plurality of adaptive loudspeaker parameters.

FIG. 4 is a detailed schematic block diagram of interior signal processing components or computational blocks of an adaptive digital impedance model 306 of the previously discussed adaptive linear digital loudspeaker model 306, or loudspeaker model 306 in abbreviation, depicted on FIG. 3. The adaptive digital impedance model 306 comprises an adaptive digital impedance model which is configured to adaptively computing and outputting five adaptive model parameters, $R_{DC}$ (DC electrical resistance of voice coil); B*I (force factor), $L_e$ (voice coil inductance) and a1 and a2 which are z-domain impedance model parameters as described below. Each of the parameter values of the five adaptive model parameters is optionally checked against certain preset parameter limits to verify that the adaptive digital impedance model appears to work correctly, e.g. that the impedance model is not diverging and outputs sensible parameter values. The computed values of the five adaptive model parameters are subsequently transmitted to a conversion block which converts the five adaptive model parameters into previously discussed plurality of adaptive loudspeaker parameters outputted by the loudspeaker model 306. In the present embodiment, the loudspeaker model 306 has been configured to compute the following five adaptive loudspeaker parameters: $R_{DC}$ (DC electrical resistance of voice coil); B*I (Force factor); $R_{MS}$ (Total mechanical damping); $K_{MC}$ (Total mechanical stiffness) and $L_e$ (voice coil inductance). The skilled person will appreciate that other adaptive loudspeaker parameters may be selected in other embodiments of the invention provided the parameter selection gives sufficiently detailed loudspeaker information to the state space model 302 of the loudspeaker.

In the adaptive digital impedance model 306 the digital voice coil current signal Im[n] and the digital voice coil voltage signal Vm[n] are applied to respective inputs of the impedance model. Each of the Im[n] and Vm[n] signals may be lowpass filtered by a digital lowpass filter 301 and applied to an input of an optional decimator (now shown) which down samples each of the Im[n] and Vm[n] signals from the first sampling frequency of the digital audio input signal to a significantly lower sampling frequency such as less than 0.5, 0.25 or 0.125 times the first sampling frequency. This combined lowpass filtering and down sampling operation reduces the sample rate of the signals in loudspeaker model 306 and other signal processing functions of the assembly leading to a reduction of computational load and reduced power consumption. The adaptive digital impedance or admittance model 306 of the loudspeaker comprises an adaptive $2^{nd}$ order IIR filter 401 which adaptively tracks or models a time-varying impedance of the voice coil of the loudspeaker reflecting inter alia a fundamental resonance frequency of the loudspeaker. The previously discussed digital voice coil current signal Im[n] is applied to a first input of the adaptive digital loudspeaker model 210 and the digital voice coil voltage signal Vm[n] is applied to a second input of the adaptive digital impedance model 306. The parameter outputs (not shown) of the adaptive digital impedance or admittance model 306 are the previously discussed four adaptive model parameters, $R_{DC}$ (DC electrical resistance of voice coil); B*I (Force factor); Le (voice coil inductance) and a1 and a2. These five adaptive model parameters are depicted inside the respective internal computational blocks 401, 403, 405 and 407.

The adaptive impedance model 306 comprises the following model parameters of the loudspeaker:

$V_e$ [n]: Estimate of voice coil voltage or drive voltage;
$R_{DC}$: DC electrical resistance of voice coil;
BI: Force factor of loudspeaker (B·I product);
$M_{MS}$: Total mechanical moving mass (including acoustic loading);
$K_{MS}$: Total mechanical stiffness;
$R_{MS}$: Total mechanical damping.
$L_e$: Voice coil inductance The adaptive IIR filter 401 is a second order filter and for convenience preferably expressed by its mechanical mobility transfer function $Y_m(z)$ in the z-domain as illustrated by the lower mobility equation. The overall operation of the adaptive digital impedance model 306 is that a parameter tracking algorithm seeks to predict the voice coil voltage $V_e$ [n] based upon a measurement of the voice coil current Im[n] and a preselected impedance model of the loudspeaker. The skilled person will appreciate that present adaptive digital impedance model 306 is applicable for a sealed enclosure mounted electrodynamic loudspeaker. An error signal $V_{ERR}$[n] is obtained from a difference between the measured, actual, voice coil voltage signal Vm[n] and an estimate of the same produced by the model, $V_e$ [n]. The skilled person will understand that various adaptive filtering methods such as LMS may be used to adapt free model parameters in the chosen loudspeaker impedance model to minimise the error signal $V_{ERR}$[n]. The free model parameters are preferably continuously transmitted to the DSP and when the error signal becomes sufficiently small, e.g. comply with a predetermined error criterion, the adapted model parameters are assumed to be correct. By keeping fixed one of the five parameters BI, $M_{MS}$, $K_{MS}$, $R_{MS}$ and $L_e$ depicted in block 401 of FIG. 4 the residual four parameters can be determined by identifying the relationship between Im[n] and Vm[n]. Mathematically, it is without great significance which one of these four parameters that is fixed, but the total moving mass $M_{MS}$ is typically a good choice. This is because the latter parameter is often relatively stable in terms of manufacturing spread and variation over time and temperature.

Figure 5:
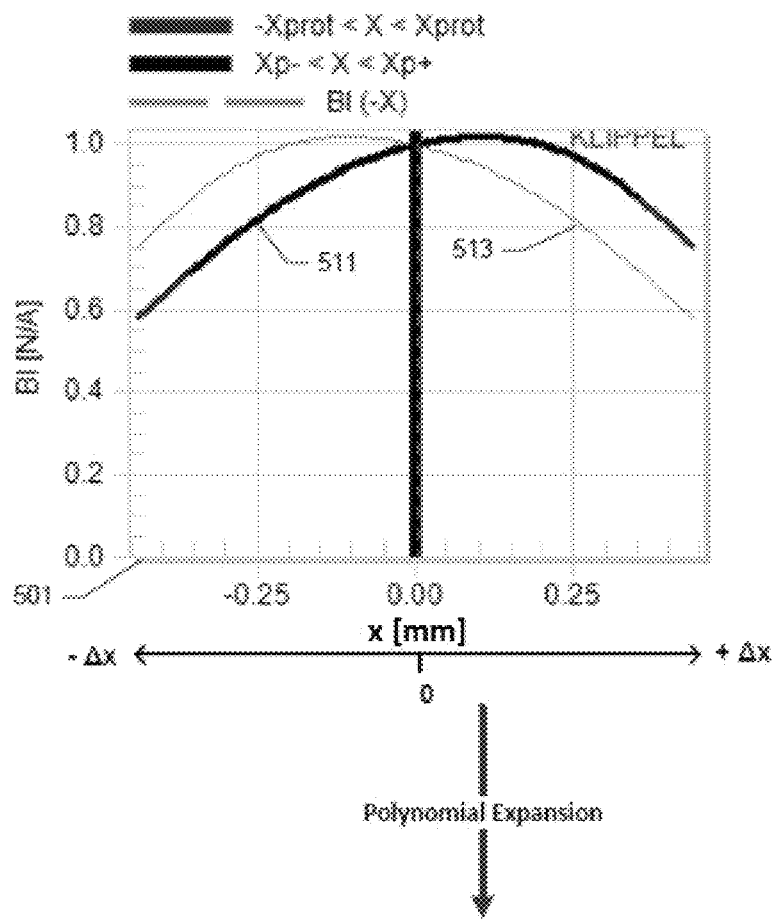
FIG. 5 is graph of an experimentally measured average non-linear behaviour of a force factor (B*I) versus diaphragm displacement with corresponding computed polynomial coefficients representing a polynomial curve fit between the force factor (B*I) and the diaphragm displacement.

FIG. 5 comprises a graph 501 of the experimentally measured average non-linear behaviour of a force factor (B*I) versus diaphragm displacement as indicated by curve 511 of a set of representative loudspeakers. The mirrored curve 513 is simply a help curve that is computed and displayed by the measurement system to allow visual assessment of the degree of symmetry of the depicted non-linear relationship. The same applies for the mirrored curve 613 of FIG. 6. The average curve 501 may be obtained in different ways. In the present embodiment, the average curve 501 has been obtained by identifying and selecting a single loudspeaker with average characteristics out of a collection of measured representative loudspeakers of the same make and model as the electrodynamic loudspeaker 1 depicted on FIG. 2. In an alternative embodiment, the average curve may be obtained by measuring and averaging the individual force factor versus diaphragm displacement characteristics for 5-10 representative loudspeaker samples of the same make and model as the electrodynamic loudspeaker 1 depicted on FIG. 2. The 5-10 representative loudspeaker samples may for example be selected from different production lots or batches to include variations of the loudspeaker parameters in the course of manufacturing. The individual force factor versus diaphragm displacement characteristics for the single average loudspeaker sample have been measured by a laser displacement sensor which is a component of the utilized KLIPPEL R&D SYSTEM for loudspeaker characterization.

The results of the individual force factor versus diaphragm displacement characteristics of the single average loudspeaker sample were exported to a proprietary software analysis program, e.g. based on MATLAB, developed by the inventors. The software analysis program computes and displays the measured force factor versus diaphragm displacement curve on a suitable graphical display as shown on graph 501. The Y-axis depicts the measured average force factor on a dimension less relative scale and the X-axis depicts the diaphragm excursion or displacement, x in mm in outward and inward direction. The force factor (B*I) has accordingly been measured for a range of +/−0.45 mm of diaphragm displacement. As illustrated by the average force factor versus diaphragm displacement curve 511, there is a significant variation of the measured average force factor, in the order of 40%, across the depicted displacement range. A polynomial curve fit to the average force factor versus diaphragm displacement curve 511 has been computed and the result displayed in box 503. The computed corresponding polynomial coefficients from order zero to order four has been displayed as BI0, BI1, BI2, BI3 and BI4, respectively. BI0 represents a normalized force factor for zero displacement of the loudspeaker diaphragm and this value is adaptively determined as discussed below. The force factor versus diaphragm displacement curve 511 exhibits a pronounced asymmetry around zero displacement (x=0) which asymmetry is caused by magnetic and mechanical construction details of the loudspeaker in question. If more than a single average loudspeaker sample is utilized, the result of each of the individual force factor versus diaphragm displacement characteristics may be exported from the utilized KLIPPEL R&D SYSTEM to the MATLAB based proprietary software analysis program. The software analysis program may be configured to computing an average measured force factor for the 5-10 representative loudspeaker samples and provide a graphical display of the result similarly to graph 501. A corresponding polynomial curve fit and polynomial coefficients to this average force factor versus diaphragm displacement curve may be computed in a manner similar to the one discussed above.

Figure 6:
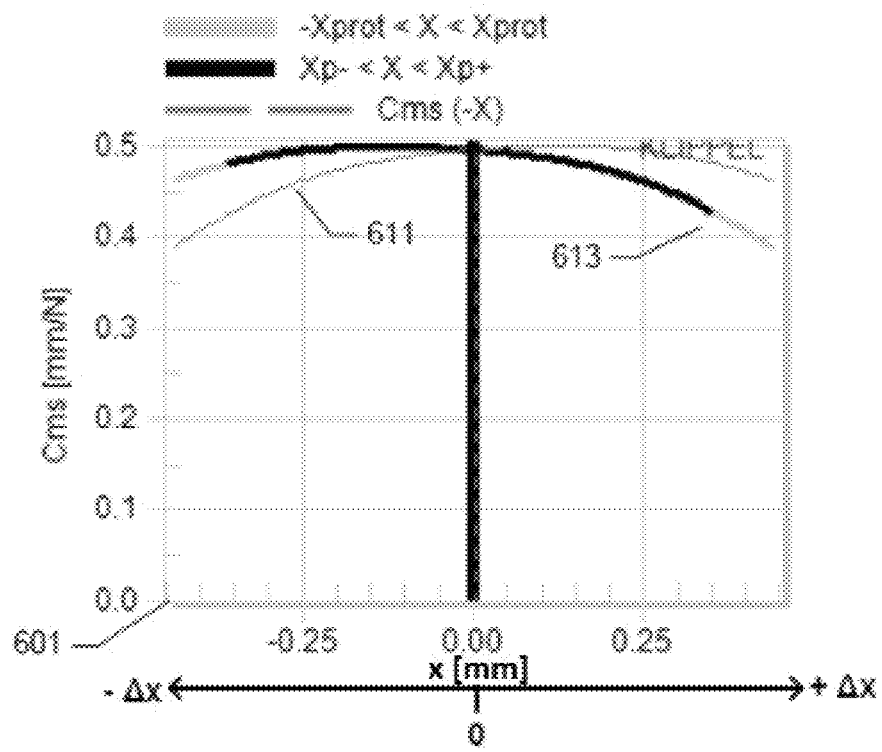
FIG. 6 is graph of an experimentally measured average non-linear behaviour of a total mechanical compliance ($C_{MS}$) versus diaphragm displacement and corresponding computed polynomial coefficients representing a polynomial curve fit between the total mechanical compliance and the diaphragm displacement.

FIG. 6 shows graph 601 depicting an experimentally measured average non-linear behaviour of a total mechanical compliance ($C_{MS}$) versus diaphragm displacement indicated by curve 611. The total mechanical compliance ($C_{MS}$) of the loudspeaker is the reciprocal quantity of the earlier discussed loudspeaker parameter total mechanical stiffness, $K_{MS}$. The average curve 601 has been obtained by identifying and selecting the single loudspeaker with average characteristics out of the batch of measured representative loudspeakers as discussed above with respect to FIG. 5. The alternative procedure where the total mechanical compliance versus diaphragm displacement characteristics of several representative loudspeaker samples are measured may be utilized instead. The Y-axis of graph 601 depicts the measured average total mechanical compliance in mm/N and the X-axis depicts the diaphragm excursion or displacement x in mm in outward and inward direction. The total mechanical compliance has accordingly been measured over a range of +/−0.45 mm of diaphragm displacement. As illustrated by the curve 611, there is a significant variation of the measured total mechanical compliance, in the order of 20%, across the depicted displacement range. A polynomial curve fit to the average total mechanical compliance versus diaphragm displacement curve 611 may be computed in a similar manner to the previously described one.

Figure 7:
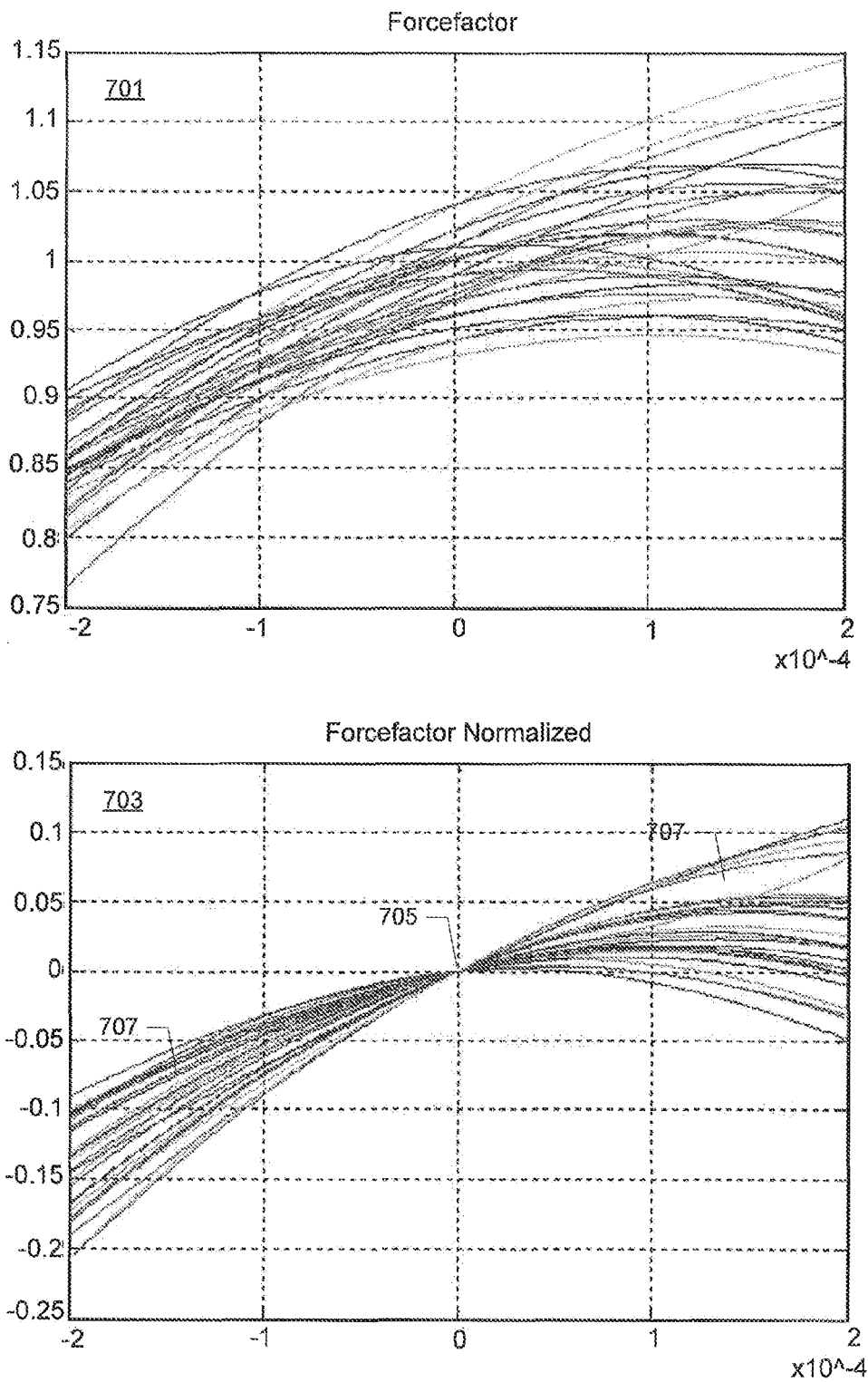
FIG. 7 shows graphs of individually measured non-linear relationships between the force factor (B*I) and diaphragm displacement for a plurality of representative electrodynamic loudspeakers in non-normalized and normalized representation.
Figure 8:
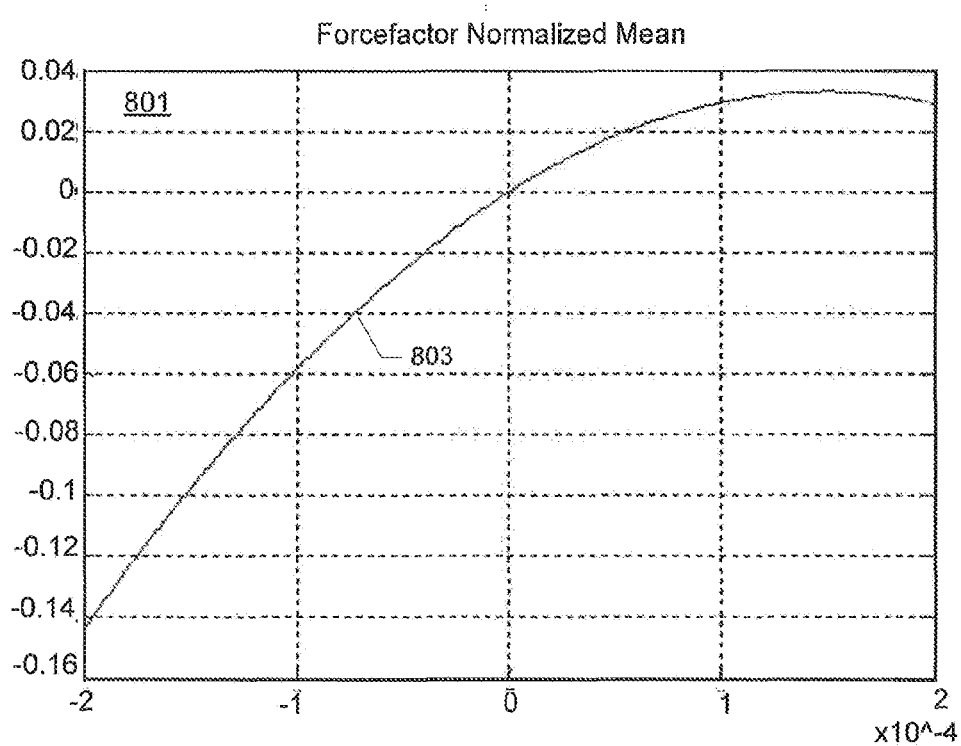
FIG. 8 shows a graph of the computed corresponding average non-linear relationship between the force factor (B*I) and diaphragm displacement in normalized representation for the plurality of representative electrodynamic loudspeakers depicted on FIG. 7.

Graph 701 of FIG. 7 shows a plurality of individually measured curves of the force factor (B*I) versus diaphragm displacement for a plurality of representative electrodynamic loudspeakers in non-normalized representation. The Y-axis depicts the measured average force factor on a dimension less relative scale and the X-axis depicts the diaphragm excursion or displacement x in mm in outward and inward direction. In this example, the number of representative electrodynamic loudspeakers is about 20, but fewer or more loudspeakers may be used as indicated by the above example using merely 5 representative electrodynamic loudspeakers to derive the desired average non-linear behaviour of the force factor. The individual force factor versus diaphragm displacement curves or characteristics were measured by the previously discussed laser displacement sensor for loudspeaker characterization. The non-linear relationship or function between the force factor and diaphragm displacement for each of the tested representative electrodynamic loudspeakers is evident from the curvature of the depicted curves on graph 701. The force factor (B*I) has accordingly been measured and recorded across a diaphragm displacement range of +/−0.20 mm. To derive or determine the desired average non-linear function between the force factor and diaphragm displacement the following steps are executed: for each of the representative loudspeakers, the plurality of force factor values versus diaphragm displacement values as graphically represented by the depicted force factor curves of graph 701 are recorded in a suitable computing device. The measured force factor curve for each of the representative loudspeakers is thereafter normalized by off-setting or dragging the force factor curve vertically, i.e. up or down along the force factor axis, at an arbitrary reference value of the diaphragm displacement (i.e. the selected loudspeaker variable in this embodiment) such as a zero diaphragm displacement as depicted on graph 703. Each of the measured force factor curves is dragged up or down, as required, until the value at zero diaphragm displacement reaches the arbitrary reference value whereby all the displaced force factor curves 707 intersect the same arbitrary force factor value at zero diaphragm displacement as indicated by reference numeral 705 of graph 703. In a subsequent step, the average value of the normalized force factor values, as represented and depicted by the force factor curves of graph 703, is computed and may be graphically represented by a single average normalized force factor curve 803 depicted on graph 801 of FIG. 8. Hence, the average normalized force factor curve 803 is set to zero at zero diaphragm displacement and only shows variation over displacement. In the present embodiment, the average value of the normalized force factor values is computed by for each diaphragm displacement value summing the normalized force factor values of all the representative loudspeakers and dividing with the number of the representative loudspeakers, i.e. in essence computing an arithmetical mean value of the force factor. The skilled person will never the less appreciate that other computation methods may be applied to compute the average value of the normalized force factor values. In one alternative embodiment, the median value of the normalized force factor values at each diaphragm displacement value may be used to represent the average value.

A polynomial function, as discussed above in connection with FIG. 5, may finally be applied to the average normalized force factor values, as represented by curve 803 on graph 801, to represent the average non-linear relationship between the force factor and diaphragm displacement of the collection of representative loudspeakers. The corresponding polynomial coefficients may be determined by a suitable polynomial curve fit as discussed above. Hence, the adaptive value of the Bl product outputted by the linear adaptive digital loudspeaker model 306 discussed above is applied to the polynomial function of the non-linearity function block 304 inside the non-linear state-space loudspeaker model 314 to make a computation of the corresponding non-linearity compensated value of the Bl product. This non-linearity compensated value of the Bl product is applied to the state-space model 302 to improve the accuracy of the computed sound pressure output, Pout, and diaphragm displacement x.

The normalization process made in connection with the determination of the average non-linear function of the loudspeaker parameter is an advantage of the present methodology of supressing feedback signals because it takes advantage of the adaptive nature of the linear adaptive digital loudspeaker model 306 of the electrodynamic loudspeaker as described in connection with FIG. 3. The linear adaptive digital loudspeaker model 306 maintains an accurate estimate of the value of the force factor, or any other selected loudspeaker parameter, at zero diaphragm displacement over time such that the loudspeaker parameter value in question remains accurate despite of the previously discussed slowly varying changes over time of important loudspeaker parameters. Therefore, the non-linear function can be utilized to determine the non-linearity compensated value of the Bl product by inserting the current value of the Bl product, as provided by the linear adaptive digital loudspeaker model, as a constant part, Bl=0, of the polynomial function 503 of FIG. 5. The desired non-linearity compensated value of the Bl product to be applied to the state-space model 302 can be directly computed from a combination of the already determined polynomial coefficients representing the average non-linear function of the loudspeaker parameter and the previous value of the diaphragm displacement x.

The invention claimed is:

1. A feedback cancellation assembly for an electroacoustic communication apparatus, comprising:
    a signal transmission path for generation and emission of an outgoing sound signal to an external environment through an electrodynamic loudspeaker,
    a signal reception path receiving a microphone input signal corresponding to sound received from the external environment and generation of a corresponding digital microphone signal at a summing node of the signal reception path,
    an electronic feedback cancellation path coupled between a tapping node of the signal transmission path and the summing node of the signal reception path to produce a feedback cancellation signal to the summing node;
    wherein the electronic feedback cancellation path comprises a non-linear digital loudspeaker model that includes a non-linear function of a specified loudspeaker variable and at least one non-linear loudspeaker parameter that is derived from a voice coil current and/or a voice coil voltage of the electrodynamic loudspeaker.

2. The feedback cancellation assembly according to claim 1, wherein the non-linear digital loudspeaker model includes a plurality of loudspeaker parameters that comprise at least one adaptive loudspeaker parameter selected from a group consisting of a force factor, a suspension compliance or stiffness, a voice coil resistance, a total mechanical damping, a total moving mass, and a voice coil inductance.

3. The feedback cancellation assembly according to claim 1, wherein the non-linear digital loudspeaker model comprises a non-linear state-space model of the electrodynamic loudspeaker.

4. The feedback cancellation assembly according to claim 1, wherein the non-linear digital loudspeaker model is configured to compute at least one non-linearity compensated value of the at least one non-linear loudspeaker parameter.

5. The feedback cancellation assembly according to claim 1, wherein the at least one non-linear loudspeaker parameter comprises one of a force factor and a suspension compliance or stiffness; and the specified loudspeaker variable comprises a diaphragm excursion or displacement of the electrodynamic loudspeaker.

6. The feedback cancellation assembly according to claim 1, wherein the signal transmission path comprises a digital-to-analog converter and an output amplifier configured to apply the voice coil current and voltage of the electrodynamic loudspeaker from the audio signal at the tapping node; and
    the signal reception path comprises a first analog-to-digital converter configured to sample and digitize the microphone input signal to generate the digital microphone signal.

7. The feedback cancellation assembly according to claim 6, comprising a second analog-to-digital converter configured to sample and digitize the voice coil voltage and/or the voice coil current.

8. A portable communication device comprising a feedback cancellation assembly according to claim 1.

9. A motorized vehicle comprising a passenger cabin having mounted therein a feedback cancellation assembly according to claim 1.

10. The feedback cancellation assembly according to claim 1, further comprising an adaptive digital filter coupled to the non-linear digital loudspeaker model,
    wherein the outgoing sound signal is acoustically received via an external feedback path having a constant or time-varying transfer function and the adaptive digital filter is configured to model at least the constant or time-varying transfer function of the external feedback path.

11. The feedback cancellation assembly according to claim 10, wherein the non-linear function represents an average non-linear relationship between the at least one non-linear loudspeaker parameter and the specified loudspeaker variable determined from non-linearity measurements on a plurality of representative electrodynamic loudspeakers.

12. The feedback cancellation assembly according to claim 10, wherein the non-linear function represents an individually measured non-linear function of the electrodynamic loudspeaker between the at least one non-linear loudspeaker parameter and the specified loudspeaker variable.

13. The feedback cancellation assembly according to claim 12, wherein the individually measured non-linear function is measured during a factory calibration of the feedback cancellation assembly when mounted in the electroacoustic communication apparatus.

14. A method of suppressing feedback signals between a loudspeaker and a microphone of an electroacoustic communication apparatus, the method comprising steps of:
applying an audio signal to the loudspeaker through a signal transmission path to emit sound signal to an external environment,
transmitting the emitted sound signal through an external feedback path of the electroacoustic communication apparatus between the loudspeaker and the microphone to produce a filtered sound signal,
receiving the filtered sound signal and producing a corresponding digital microphone signal in a signal reception path,
tapping the audio signal from the signal transmission path,
determining a voice coil current and/or a voice coil voltage of the loudspeaker,
filtering the tapped audio signal by a non-linear digital loudspeaker model that includes a non-linear function of a specified loudspeaker variable and at least one non-linear loudspeaker parameter that is derived from the voice coil current and/or voice coil voltage to produce a first feedback signal, and
compensating the digital microphone signal in the signal reception path based on the first feedback signal.

15. The method of suppressing feedback signals according to claim 14, comprising a step of:
adapting a value of the at least one loudspeaker parameter over time based on the voice coil current and/or voice coil voltage of the loudspeaker.

16. The method of suppressing feedback signals according to claim 14, wherein the at least one non-linear loudspeaker parameter is selected from a group consisting of a force factor, a suspension compliance or stiffness, a voice coil resistance, a total mechanical damping, a total moving mass, and a voice coil inductance.

17. The method of suppressing feedback signals according to claim 14, wherein the non-linear function represents an average non-linear function between the at least one non-linear loudspeaker parameter and the specified loudspeaker variable determined from measurements on a plurality of representative electrodynamic loudspeakers.

18. The method of suppressing feedback signals according to claim 17, wherein the determination of the average non-linear function comprises steps of:
applying a test signal to each loudspeaker of a plurality of representative loudspeakers wherein the test signal is configured to excite a particular relationship between the at least one non-linear loudspeaker parameter and the specified loudspeaker variable across a specified range of the loudspeaker variable,
recording a plurality of parameter values of the at least one non-linear loudspeaker parameter across the specified range of the loudspeaker variable for each loudspeaker of the plurality of representative loudspeakers,
normalizing the plurality of recorded parameter values of the at least one non-linear loudspeaker parameter for each loudspeaker at a common reference value of the specified loudspeaker variable,
computing an average value of the plurality of normalized parameter values of the loudspeaker variable for the plurality of representative loudspeakers across the specified range of the loudspeaker variable for representing the average non-linear function between the at least one non-linear loudspeaker parameter and the loudspeaker variable.

19. The method of suppressing feedback signals according to claim 18, wherein normalizing the plurality of recorded parameter values comprises:
increasing or decreasing each of the plurality of recorded parameter values for each loudspeaker at the common reference value of the loudspeaker variable such that all parameter values of the loudspeaker parameter are substantially equal at the common reference value.

20. The method of suppressing feedback signals according to claim 19, wherein the reference value of the specified loudspeaker variable is zero diaphragm excursion.

21. The method of suppressing feedback signals according to claim 14, wherein the at least one non-linear loudspeaker parameter comprises one of a force factor and a suspension compliance or stiffness of a plurality of representative loudspeakers; and
the specified loudspeaker variable comprises a diaphragm excursion or displacement of the plurality representative loudspeakers.

22. The method of suppressing feedback signals according to claim 14, further comprising:
filtering the first feedback signal by an adaptive digital filter modelling at least a constant or time-varying transfer function of the external feedback path to produce a second feedback signal,
subtracting the second feedback signal and the digital microphone signal to produce a feedback compensated microphone signal, and
processing the feedback compensated microphone signal in the signal reception path, wherein the first feedback signal estimates a sound pressure of the sound signal from the loudspeaker.

* * * * *